United States Patent [19]

Welch

[11] 4,107,412

[45] Aug. 15, 1978

[54] OLEFIN POLYMERIZATION PROCESS AND CATALYST THEREFOR

[75] Inventor: M. Bruce Welch, Bartlesville, Okla.

[73] Assignee: Phillips Petroleum Company, Bartlesville, Okla.

[21] Appl. No.: 744,896

[22] Filed: Nov. 24, 1976

[51] Int. Cl.$^2$ ............................ C08F 4/02; C08F 10/06
[52] U.S. Cl. ................................ 526/114; 252/429 B; 252/429 C; 526/125; 526/351; 526/903; 526/906
[58] Field of Search ....................... 252/429 B, 429 C; 526/114, 125, 144, 906

[56] References Cited

U.S. PATENT DOCUMENTS

| | | | |
|---|---|---|---|
| 3,238,146 | 3/1966 | Hewett et al. | 526/125 |
| 3,642,746 | 2/1972 | Kashiwa et al. | 526/125 |
| 3,888,835 | 6/1975 | Ito et al. | 526/125 |

FOREIGN PATENT DOCUMENTS

| | | |
|---|---|---|
| 2,347,577 | 5/1974 | Fed. Rep. of Germany. |
| 3,924,272 | 10/1964 | Japan. |
| 1,387,888 | 3/1975 | United Kingdom. |
| 1,387,889 | 3/1975 | United Kingdom. |
| 1,387,890 | 3/1975 | United Kingdom. |
| 1,286,867 | 8/1972 | United Kingdom. |

Primary Examiner—Edward J. Smith

[57] ABSTRACT

Aliphatic monoolefins are polymerized employing a catalyst consisting of a first component formed by co-comminuting a mixture of a halogenated titanium compound, a magnesium or manganese dihalide, a Lewis base, and an aromatic compound which is normally liquid at about 25° C; a second component consisting of a trialkylaluminum compound and a Lewis base; and, optionally, third component which is a dialkylaluminum halide.

9 Claims, No Drawings

OLEFIN POLYMERIZATION PROCESS AND CATALYST THEREFOR

This invention relates to a process for polymerizing olefins.

In the field of catalytic polymerization of olefins such as ethylene and propylene to produce useful solid polymers, a continuing objective is to increase productivity. By productivity is meant the amount of useful solid polymer that is obtained by means of a given quantity of catalytic materials. This is important because the removal of catalytic materials from the solid polymer is almost always necessary and is generally troublesome or expensive to carry out. Thus, improved polymerization processes are desired in which the productivity of polymer per unit of catalyst material is so great that the amount of catalyst residues remaining in the polymer is insignificant and the catalyst removal steps can be minimized or omitted.

One known catalyst system which is said to produce large quantities of solid polymer per unit of catalyst employs two components wherein the first component is prepared from materials such as titanium tetrachloride, ethyl benzoate and magnesium chloride, and the second component is prepared from materials such as triethylaluminum and ethyl anisate.

It is known that an improvement in the type of catalyst system represented above is alleged by the incorporation of a solid organic material into the first component which is inert to the catalyst component. An example of such material is durene. The incorporation of a material such as durene is said to retain the stereospecific nature of the catalyst while permitting a concomitant decrease in magnesium dihalide content and provide a high yield of usable polymer per unit of catalyst.

It has been found, however, that when the first catalyst component represented above is milled together with a solid organic compound such as durene, the milled mixture is difficult to remove from the milling vessel.

It is an object of this invention to provide an improved polymerization catalyst system.

It is another object of this invention to provide an olefin polymerization process employing the improved catalyst system.

Other objects, aspects and advantages of this invention will be readily apparent to those skilled in the art from the reading of the following disclosure.

In accordance with the present invention there is provided a catalyst system consisting of a first component formed by co-comminuting a mixture of a halogenated divalent, trivalent or tetravalent titanium compound, a Lewis base, a dihalide of magnesium or manganese and an aromatic compound which is normally liquid at about 25° C selected from the group consisting of aromatic compounds having the formula

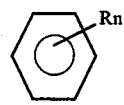

wherein R is an alkyl group having 1 to 4 carbon atoms and $n$ is an integer having a value of 0 to 4, preferably 0 to 3, and halogenated derivatives thereof; and a second component consisting of at least one organoaluminum compound, and a Lewis base, which can be the same or different from the Lewis base employed in the first component; and, optionally, a third component which is a dialkylaluminum halide.

Further, in accordance with the present invention, aliphatic monoolefins are polymerized under polymerization conditions employing the above catalyst system.

A broad range of olefins can be polymerized by the process and catalyst system of the present invention. The products formed by the process of this invention will be relatively high molecular weight solid polymers. The products can be used in making films, fibers and various molded articles.

The process of this invention can be used to polymerize or copolymerize aliphatic mono-1-olefins containing from 2 to 8 carbon atoms per molecule having no chain branching, such as ethylene and those capable of forming stereospecific polymers, such as propylene, isobutylene, isoamylene, hexene, octene and the like and mixtures thereof.

The catalyst system of this invention consists of two and, optionally, three components. The first component is formed of a co-comminuted, i.e., intimately mixed, mixture of a titanium halide, a Lewis base, a magnesium or magnesium dihalide and a normally liquid aromatic compound.

The titanium compound is a di-, tri or tetra- valent chloride, bromide or iodide. The presently preferred titanium halide is titanium tetrachloride, because of its ready availability and relatively low cost.

The Lewis base used in the invention is liquid or gaseous under the conditions used in forming the first catalyst component and is selected from the group consisting of $C_6$-$C_{12}$ aromatic carboxylic acids, $C_1$-$C_{15}$ aliphatic carboxylic acids, $C_8$-$C_{20}$ alkyl esters of aromatic carboxylic acids, $C_2$-$C_{13}$ alkyl esters of aliphatic carboxylic acids, $C_2$-$C_{12}$ aliphatic ethers, $C_5$-$C_8$ cyclic ethers, $C_3$-$C_{13}$ aliphatic ketones, $C_7$-$C_{12}$ aromatic ketones, $C_7$-$C_{12}$ aromatic aldehydes, $C_7$-$C_9$ aromatic alcohols, $C_1$-$C_{12}$ aliphatic alcohols, $C_1$-$C_{15}$ aliphatic acid halides, $C_2$-$C_{12}$ aliphatic nitriles, $C_1$-$C_{20}$ aliphatic amines, $C_6$-$C_{12}$ aromatic amines, $C_3$-$C_{20}$ aliphatic phosphines and $C_{18}$-$C_{20}$ aromatic phosphines.

Particularly applicable are esters represented by the formula

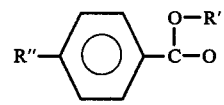

wherein R' is an alkyl group having from 1 to 4 carbon atoms and R" is a monovalent radical selected from the group consisting of —F, —Cl, —Br, —I, —OH, —OR', —OOCR', —SH, —NH$_2$, —NHR', —NR'$_2$, —NHCOR', —NO$_2$, —CN, —CHO, —COR', —COOR', —CONH$_2$, —CONR'$_2$, —CONHR', —SO$_2$R', —CH$_3$, and —H. Examples of such compounds include: ethyl benzoate, ethyl anisate, ethyl-p-dimethylaminobenzoate, ethyl p-dimethylaminobenzoate, ethyl p-fluorobenzoate, ethyl p-cyanobenzoate, methyl benzoate, isopropyl p-diethylaminobenzoate, butyl p-fluorobenzoate, n-propyl p-cyanobenzoate, ethyl p-trifluoromethylbenzoate, methyl p-hydroxybenzoate, ethyl p-acetylbenzoate, isopropyl p-formylbenzoate, methyl p-nitrobenzoate, ethyl p-carbamoylbenzoate, methyl p-mercaptobenzoate and the like and mixtures thereof.

Regarding the magnesium dihalide and magnesium dihalide, generally a magnesium dihalide is used. Specifically they are a chloride, bromide or iodide of magnesium or manganese. As an example, very good results were obtained using magnesium dichloride. These dihalides are used in the anhydrous form. When they contain water of crystallization, they can be used after heating in a stream of a halogen corresponding to the respective dihalide.

The aromatic compound used in the first component is normally liquid at room temperature, i.e., about 25° C. The aromatic compound has the general formula

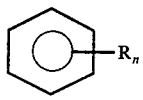

as described previously. Examples of suitable aromatic hydrocarbons and halogenated aromatic hydrocarbons include: benzene, alkylated benzenes having up to four alkyl groups per molecule, such as toluene, ethylbenzene, t-butylbenzene, o-, m- or p-xylene and mixtures thereof, 1,4-diethylbenzene, 1,3,5-trimethylbenzene, 1-isopropyl-4-methylbenzene, 1,2,3,4-tetramethylbenzene, 1,2,3,5-tetramethylbenzene and the like, chlorobenzene, phenylchloroform, and the like and mixtures thereof. Commercial xylene solvent mixtures consisting of the o-, m- and p-isomers, or those isomers admixed with ethylbenzene can be used with good results.

The quantity of the aromatic compound incorporated into the first component can vary from about 1 to about 25 weight percent, based upon the total weight of the aromatic compound together with the other first component ingredients. Preferably, the amount of the aromatic compound will be in the approximate range of 3 to 20 weight percent of the total weight of the first catalyst component.

The first catalyst component is formed by intensively mixing the above-named ingredients. The equipment to be used in comminuting the mixture of ingredients can be one of conventional design. Examples include a ball mill, vibrating mill, jet pulverizers and the like.

The above-named ingredients can be charged separately to the comminuting device, or the Lewis base and the titanium halide can be mixed in advance to form an addition compound or complex.

The above comminuting operation is carried out either under vacuum or in an inert atmosphere. It is essential to ensure that moisture and oxygen are completely excluded. The timing and order of admixing the ingredients to be co-comminuted are virtually optional.

The comminuting temperature is also largely optional, generally ranging from $-30°$ C to 150° C, but usually is carried out at about ambient temperature.

The time required to achieve the desired comminution ranges from about 5 to about 250 hours, generally from about 10 to about 175 hours.

With regard to the composition of the first catalyst component, the molar ratio of the halogenated titanium compound to the Lewis base compound is generally within the range of about 0.7:1 to about 1.6:1. The first catalyst component will generally contain (a) 1 to 35 weight percent of titanium tetrachloride or the titanium equivalent of other titanium halides, (b) 1 to 50 weight percent of the Lewis base, (c) 1 to 65 weight percent of the magnesium dihalide or manganese dihalide, and (d) 1 to 25 weight percent of the liquid aromatic hydrocarbon. The amounts actually used should be selected within the above ranges with reference to such factors as the desired yield per gram of the first component and the chemical composition of residual catalyst in the purified polymer which is anticipated from the contemplated after-treatment.

The second catalyst component consists of a trialkylaluminum compound of the formula $AlR'''_3$ wherein each $R'''$ is the same or different alkyl group containing from 1 to 12 carbon atoms, and a Lewis base, as described previously.

Examples of suitable trialkylaluminum compounds include trimethylaluminum, triethylaluminum, tri-n-dodecylaluminum, dimethylethylaluminum and mixtures thereof. Triethylaluminum is presently preferred.

The molar ratio of the trialkylaluminum compound to the Lewis base can vary over a wide range, depending upon the specific compounds used. In general, the molar ratio of the trialkylaluminum compound to the Lewis base compound will be in the approximate range of 1:1 to 8:1.

If desired, a third component of the general formula $AlR^{iv}_2X$, wherein each $R^{iv}$ is the same or different alkyl group having from 1 to 12 carbon atoms and X is chlorine, bromine or iodine, can be incorporated into the mixtures of the first and second catalyst components. Examples of suitable compounds of the formula $AlR^{iv}_2X$ include: dimethylaluminum bromide, diethylaluminum chloride, diisopropylaluminum iodide, di-(2-ethylhexyl)aluminum chloride, di-n-dodecylaluminum chloride and the like.

The amounts of the above organoaluminum compounds used in the catalyst system will be such as to provide an atomic ratio of Al:Ti in the approximate range of 5:1 to 2000:1, preferably 25:1 to 1500:1. The amount of aluminum expressed in such fashion is intended to be the aluminum in the $AlR'''_3$ or in the $AlR'''_3$ plus $AlR^{iv}_2X$.

The conditions for the polymerization process are generally similar to those well known for related processes using a titanium-organoaluminum catalyst system. The process can be carried out continuously or batchwise. The process is conveniently carried out in the liquid phase in the presence or absence of a diluent such as an inert hydrocarbon, e.g., n-heptane, isobutane, cyclohexane, etc.; however, it is understood that the invention is not limited to liquid phase reactions. If no diluent is used, the reaction is carried out in liquid monomer.

The polymerization temperature can range from 60° to 212° F (15°–100° C). As an example, the polymerization of propylene in liquid propylene is conveniently carried out in the range of about 75°–175° F (24°–80° C), preferably about 120°–160° F (49°–71° C).

The polymerization pressure can be any convenient pressure. When a liquid phase polymerization is carried out, the pressure will be such as to maintain the reactants in the liquid phase within the reaction zone. In general, the pressure used will range from atmospheric to about 1000 psig (6.9 MPa).

In the practice of this invention, although the molecular weight of the polymer varies with the mode of reaction, type of catalyst, and other polymerization conditions, the molecular weight can be controlled by the addition of small amounts of hydrogen.

The catalyst components can be charged to the reactor individually, in any order, or they can be premixed, then charged to the reactor. When only the first and second components are used, the second component is generally charged first, followed by the addition of hydrogen, if used, and a substantial portion of the monomer. The first component is then charged, after which the reactor and contents are brought to the desired reaction temperature and polymerization is carried out for the desired period of time. When liquid phase conditions are used, sufficient monomer is intermittently charged to the reactor as required to maintain a liquid full condition.

When the third catalyst component is used, it can be charged to the reactor prior to or during the addition of the second component. Good results can be obtained by charging the third component at about room temperature together with a substantial portion of the monomer, heating the reactor and its contents to about 10°–15° F below polymerization temperature, charging the second catalyst component and hydrogen, if used, followed by the first component. The reactor and its contents are then heated to the desired polymerization temperature.

After completion of the polymerization reaction or after a suitable residence time in the reaction zone, the reactor contents are discharged, cooled and treated with an agent such as an alcohol to deactivate the catalyst system. The polymer is isolated and purified by a suitable procedure such as by drying under vacuum.

The following examples illustrate the invention:

EXAMPLE I

Catalyst component 1 was prepared for each of 9 catalyst systems by separately charging to a 1 liter spherical stainless steel vessel containing about 2.5 kg of ½ inch (1.3 cm) stainless steel balls the components shown in the following table. The magnesium chloride was previously dried 6 hours at 800° F (426° C). The mixtures were ball milled for the time given in the table. The mole ratio of titanium tetrachloride to ethyl benzoate in each catalyst component 1 thus prepared was about 1:1. The quantities of each compound used, ball milling times and calculated weight percentage of each compound are given in Table 1. Ball milling was conducted at ambient temperature without employing cooling, unless indicated otherwise.

In the following table, the catalyst components 1, designated A, B and C are control catalysts and those designated D-I are within the scope of this invention.

The catalyst designated A was prepared by ball milling a mixture of titanium tetrachloride, magnesium chloride and ethyl benzoate. Those designated B and C were prepared by ball milling the above ingredients together with a solid organic compound, durene. The invention catalysts, designated D-I were prepared by milling the titanium tetrachloride, magnesium chloride and ethyl benzoate together with a normally liquid aromatic compound.

Table I

| Catalyst Designation Compound | Control Catalysts | | | Invention Catalysts | | | | | |
|---|---|---|---|---|---|---|---|---|---|
| | A | B | C | D | E | F | G | H | I |
| Magnesium chloride, g | 64.3 | 51.0 | 40.0 | 60.3 | 60.3 | 60.3 | 60.3 | 60.3 | 60.3 |
| Titanium tetrachloride, g | 19.8 | 15.8 | 12.3 | 18.6 | 18.6 | 18.6 | 18.6 | 18.6 | 18.6 |
| Ethyl benzoate, g | 15.9 | 12.5 | 9.8 | 14.9 | 14.9 | 14.9 | 14.9 | 14.9 | 14.9 |
| Mixed xylenes[1], g | 0 | 0 | 0 | 6.9 | 6.9 | 0 | 0 | 0 | 0 |
| 1,2,3,4-tetramethylbenzene, g | 0 | 0 | 0 | 0 | 0 | 13.2 | 0 | 0 | 0 |
| 1,2,3,5-tetramethylbenzene, g | 0 | 0 | 0 | 0 | 0 | 0 | 13.0 | 0 | 0 |
| Toluene, g | 0 | 0 | 0 | 0 | 0 | 0 | 0 | 6.9 | 0 |
| Phenylchloroform, g | 0 | 0 | 0 | 0 | 0 | 0 | 0 | 0 | 19.2 |
| Durene, g | 0 | 51.0 | 40.2 | 0 | 0 | 0 | 0 | 0 | 0 |
| Total Weight | 100.0 | 130.3 | 102.3 | 100.7 | 100.7 | 107.0 | 106.8 | 100.7 | 113.0 |
| Milling Time, hours | 24 | 24 | 24 | 24 | 24 | 24[2] | 24[2] | 24 | 26 |
| Weight Percent | | | | | | | | | |
| Magnesium chloride | 64.3 | 39.1 | 39.1 | 59.9 | 59.9 | 56.0 | 56.1 | 59.9 | 53.0 |
| Titanium tetrachloride | 19.8 | 12.1 | 12.0 | 18.5 | 18.5 | 17.3 | 17.3 | 18.5 | 16.4 |
| Ethyl benzoate | 15.9 | 9.6 | 9.6 | 14.8 | 14.8 | 14.5 | 14.5 | 14.8 | 13.7 |
| Aromatic compound | 0 | 39.1 | 39.3 | 6.9 | 6.9 | 12.3 | 12.1 | 6.9 | 17.0 |
| Recovery, % | nd[3] | nd | 78 | 95 | nd | nd | nd | nd | nd |

[1]Commercially obtained, boiling range 137°–144° C.
[2]Cooling spray used during milling.
[3]nd means not determined.

An advantage of the present invention is seen by comparing the recovery of the durene-containing catalyst C with the recovery of the invention catalyst D. Catalyst D was a free-flowing mixture which was readily recovered from the milling vessel, while catalyst C was not so free-flowing and only 78% of this material was recovered.

EXAMPLE II

In a series of propylene polymerization runs, a dry air-free, 1 gallon (3.8 liter) stirred stainless steel reactor, was charged in each run at room temperature (about 25° C) under a gaseous propylene flush with catalyst component 2, catalyst component 1, about 0.9 liter of hydrogen (STP) and sufficient liquid propylene to fill the reactor about ⅓ full. The reactor and contents were heated to 150° F (66° C) as additional propylene was added to obtain a liquid full reactor. Polymerization continued for 1 hour at 150° F with intermittent addition of propylene as required to maintain liquid full conditions. The reactor and contents were then cooled to about 70° F (21° C), 10 cc of methanol were added and mixed with the contents and the mixture drained into a receiver. The polymer was isolated and dried at ambient conditions.

Propylene soluble polymer remaining in the liquid propylene was determined by flashing the propylene and weighing the residue. Xylene soluble polymer is the amount of total polymer (excluding propylene solubles) that remains in solution after the polymer sample is dissolved in hot xylene and the solution cooled to room temperature. Xylene soluble polymer was determined by adding 1 gram of the polymer to 100 ml of xylene and heating the mixture, with stirring, to near the boiling point of the xylene, to dissolve the polymer. The solution was cooled and the xylene-insoluble polymer precipitated out. The soluble polymer remaining in the mother liquor was determined by evaporating an aliquot portion of the mother liquor to dryness and weighing the residue. Productivity (calculated) is given in terms of grams polymer produced per gram catalyst (catalyst component 1) per hour and also grams polymer produced per gram titanium per hour.

The quantities of catalyst components used and atomic ratios of Al/Ti and results obtained are given in Table II. Runs 1-4 and 5-6 are control runs. In runs 1-4, the catalyst component 1 ingredients were dry milled. In runs 5-6 a solid aromatic compound was milled together with the remaining ingredients of catalyst component 1.

Runs 7-23 are runs in accordance with the invention wherein the ingredients of catalyst component 1 were milled together with a normally liquid aromatic compound or mixture of such compounds.

Runs 1-4 represent control runs. Less titanium was present in the catalysts charged to these runs than to the invention runs 7-23, as reflected by the Al/Ti ratios which are at least about 3.6 times higher than in the invention runs. Based on productivity figures, the control catalyst systems were generally somewhat more productive than the invention catalysts. However, more propylene soluble polymer was produced with the control catalyst systems than with the invention catalyst systems, thus cancelling out the improvement in yield.

Thus the primary advantage of including a liquid aromatic compound in catalyst component 1 resides in the formation of an active propylene polymerization catalyst system characterized by production of reduced propylene soluble polymer compared to an otherwise similar system containing titanium tetrachloride, magnesium chloride and ethyl benzoate, as catalyst compo- Table II

| | | | | | | | Propylene Polymerization | | | | | | |
|---|---|---|---|---|---|---|---|---|---|---|---|---|---|
| | Catalyst Component 1 | | Catalyst Component 2 | | Atomic | Polymer | Calculated Productivity | | Xylene Insoluble | Propylene Soluble | Solubles, wt.% | |
| Run No. | Catalyst Desig. | Weight, mg. | Ti, mmol | TEA[1] mmol | EA[2], mmol | Ratio Al:Ti | Yield g | g/g cat. | g/g Ti × 10⁻³ | Polymer g | Polymer g | Xy-lene | Propyl-ene |
| 1 | A | 44.8 | 0.0118 | 3.22 | 1.04 | 272 | 310 | 6920 | 138 | 298 | 17 | 3.8 | 5.5 |
| 2 | A | 70.1 | .0185 | 6.35 | 2.14 | 343 | 464 | 6620 | 133 | 448 | 20 | 3.4 | 4.3 |
| 3 | A | 89.0 | .0235 | 6.35 | 2.14 | 270 | 387 | 4350 | 85 | 374 | 18 | 3.3 | 4.7 |
| 4 | A | 67.8 | .0179 | 6.35 | 2.14 | 355 | 391 | 5770 | 115 | 375 | 18 | 4.1 | 4.6 |
| Average Runs 1-4 | | | | | | | | 5920 | 118 | | | 3.4 | 4.8 |
| 5 | B | 93.7 | 0.0598 | 6.05 | 2.14 | 101 | 311 | 3320 | 108.48 | 299 | 7 | 3.7 | 2.2 |
| 6 | B | 105.1 | .0671 | 6.05 | 2.14 | 90.2 | 310 | 2950 | 97 | 299 | 7 | 3.4 | 2.2 |
| Average Runs 5-6 | | | | | | | | 3140 | 102.74 | | | 3.6 | 2.2 |
| 7 | D | 90.1 | 0.0887 | 6.05 | 2.14 | 68.2 | 476 | 5230 | 112 | 460 | 13 | 3.4 | 2.7 |
| 8 | D | 57.1 | .0557 | 3.07 | 1.10 | 55.1 | 139 | 2430 | 52.1 | 136 | 3 | 1.9 | 2.1 |
| 9 | D | 104.9 | .1022 | 6.05 | 2.14 | 59.2 | 507 | 4830 | 103 | 495 | 15 | 2.4 | 2.9 |
| 10 | D | 103.0 | .1004 | 6.05 | 2.14 | 60.3 | 457 | 4440 | 95 | 439 | 11 | 4.0 | 2.4 |
| 11 | D | 91.5 | .0891 | 6.05 | 2.14 | 67.9 | 518 | 5660 | 121 | 502 | 15 | 3.0 | 2.8 |
| 12 | D | 99.4 | .0968 | 6.05 | 2.14 | 62.5 | 403 | 4050 | 86.9 | 386 | 12 | 4.1 | 2.9 |
| 13 | D | 92.6 | .0901 | 6.05 | 2.14 | 67.1 | 434 | 4690 | 100 | 421 | 9 | 3.1 | 2.0 |
| 14 | D | 98.0 | .0956 | 6.05 | 2.14 | 63.3 | 501 | 5110 | 109 | 481 | 10 | 3.9 | 2.0 |
| 15 | D | 104.5 | .1018 | 6.05 | 2.14 | 59.4 | 486 | 4650 | 99.6 | 469 | 16 | 3.4 | 3.2 |
| 16 | D | 102.1 | .0995 | 6.05 | 2.14 | 60.8 | 600 | 5880 | 126 | 575 | 17 | 4.1 | 2.75 |
| Average Runs 7-16 | | | | | | | | 4770 | 100 | | | 3.3 | 2.6 |
| 17 | E | 105.4 | 0.1027 | 6.05 | 2.14 | 58.9 | 383 | 3630 | 77.8 | 370 | 9 | 3.4 | 2.3 |
| 18 | E | 90.8 | .0885 | 6.05 | 2.14 | 68.4 | 364 | 4010 | 85.8 | 352 | 11 | 3.4 | 2.9 |
| 19 | E | 90.1 | .0886 | 6.05 | 2.14 | 68.9 | 306 | 3400 | 72.7 | 395 | 7 | 2.9 | 2.25 |
| Average Runs 17-19 | | | | | | | | 3680 | 78.8 | | | 3.2 | 2.5 |
| 20 | F | 105.0 | 0.0958 | 6.05 | 2.14 | 63.2 | 303 | 2890 | 66.0 | 294 | 7 | 3.1 | 2.25 |
| 21 | G | 89.8 | .0818 | 6.05 | 2.14 | 74.0 | 214 | 2380 | 54.6 | 205 | 4 | 4.3 | 1.8 |
| 22 | H | 95.4 | .0931 | 6.05 | 2.14 | 65.0 | 344 | 3610 | 77.1 | 333 | 14 | 3.2 | 3.9 |
| 23 | I | 94.5 | .0816 | 6.05 | 2.14 | 74.1 | 331 | 3500 | 84.7 | 316 | 14 | 4.6 | 4.1 |

[1] Triethylaluminum, used as a 14.3 weight percent solution in n-hexane.
[2] Ethylanisate.

Inspection of the results presented in Table II shows that active catalyst systems for propylene polymerization result when catalyst components 1 and 2 are combined. Runs 7-16 were made using mixed xylenes as part of catalyst component 1. At the conditions employed, the average calculated productivity obtained was 4770 grams polymer per gram catalyst component 1. Average propylene soluble polymer amounted to only 2.6 weight percent and xylene soluble polymer amounted to only 3.3 weight percent.

Runs 17-19 represent another series similar to the preceding runs except that a second batch of catalyst component 1 was used. It was not as effective as the first batch based on polymerization runs but good results were nevertheless obtained.

Runs 20-23 show that active catalysts are obtained with a liquid aromatic compound selected from among 1,2,3,4-tetramethylbenzene, 1,2,3,5-tetramethylbenzene, toluene and phenyl chloroform. The best results were obtained using commercially obtained mixed xylenes as nent 1.

Runs 5 and 6 also represent control runs, in which catalyst component 1 was prepared by milling titanium tetrachloride, magnesium chloride and ethyl benzoate together with durene. In comparing invention runs 7-16 with runs 5 and 6, it is clear that more polymer is produced using the invention catalyst than by using the durene-containing catalyst. The average productivity for runs 7-16 is 4770 grams of polymer per gram of catalyst whereas the average productivity for the durene-containing catalyst is only 3140 grams of polymer per gram of catalyst.

Reasonable variations and modifications, which will be apparent to those skilled in the art, can be made in this invention without departing from the spirit and scope thereof.

What is claimed is:

1. A process which comprises polymerizing at least one aliphatic monoolefin having from 2 to 8 carbon atoms and no chain branching, at a polymerization temperature, with a catalyst system active for such polymerization consisting of:
  A. a first component formed of a co-comminuted mixture of
    (1) a halogenated divalent, trivalent or tetravalent titanium compound selected from the group consisting of the chlorides, bromides and iodides thereof;
    (2) a Lewis base;
    (3) a dihalide of a divalent metal selected from the group consisting of magnesium and manganese, chlorides, bromides and iodides; and
    (4) an aromatic compound which is normally liquid at about 25° C selected from the group consisting of aromatic compounds having the formula

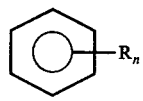

wherein R is an alkyl group having 1 to 4 carbon atoms and n is an integer having a value of 0 to 4, and halogenated derivatives thereof;
  B. a second component consisting of
    1. at least one trialkylaluminum compound of the formula $AlR'''_3$, wherein $R'''$ is an alkyl group having from 1 to 12 carbon atoms; and
    2. a Lewis base; and
  C. an optional third component which is a dialkylaluminum halide of the formula $AlR^{iv}_2X$, wherein $R^{iv}$ is an alkyl group having from 1 to 12 carbon atoms and X is a halide selected from the group consisting of chloride, bromide and iodide,
wherein the molar ratio of said halogenated titanium compound to said Lewis base is in the range of about 0.7:1 to about 1.6:1, said first component containing from 1 to 35 weight percent of said titanium compound, from 1 to 50 weight percent of said Lewis base, from 1 to 65 weight percent of said dihalide of magnesium or manganese and from 1 to 25 weight percent of said aromatic compound.

2. The process of claim 1 wherein said Lewis base is an ester represented by the formula

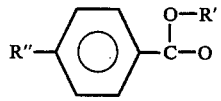

wherein R' is an alkyl group having from 1 to 4 carbon atoms and R" is a monovalent radical selected from the group consisting of —F, —Cl, —Br, —I, —OH, —OR', —OOCR', —SH, —NH$_2$, —NHR', —NR'$_2$, —NHCOR', —NO$_2$, —CN, —CHO, —COR', —COOR', —CONH$_2$, —CONR'$_2$, —CONHR', —SO$_2$R', —CH$_3$, and —H.

3. The process of claim 1 wherein the amount of said normally liquid aromatic compound is in the range of 3 to 20 weight percent.

4. The process of claim 1 wherein said monoolefin is propylene.

5. The process of claim 1 wherein the amount of said trialkylaluminum compound and said optional dialkylaluminum halide compound is such as to provide an atomic ratio of Al:Ti in the approximate range of 5:1 to 2000:1.

6. The process of claim 1 wherein said polymerization is carried out in the liquid phase at a temperature in the range of 60° to 212° F.

7. A catalyst system useful for the polymerization of aliphatic monoolefins which consists of:
  A. A first component formed of a co-comminuted mixture of
    1. a halogenated divalent, trivalent or tetravalent titanium compound selected from the group consisting of the chlorides, bromides and iodides thereof;
    2. a Lewis base;
    3. a dihalide of a divalent metal selected from the group consisting of the chlorides, bromides and iodides of magnesium and manganese; and
    4. an aromatic compound which is normally liquid at about 25° C selected from the group consisting of aromatic compounds having the formula

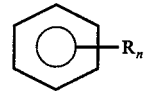

wherein R is an alkyl group having 1 to 4 carbon atoms and $n$ is an integer having a value of 0 to 4, and halogenated derivatives thereof;
  B. a second component consisting of
    1. at least one trialkylaluminum compound of the formula $AlR'''_3$ wherein $R'''$ is an alkyl group having from 1 to 12 carbon atoms; and
    2. a Lewis base; and
  C. an optional third component which is a dialkylaluminum halide of the formula $AlR^{iv}_2X$ wherein $R^{iv}$ is an alkyl group having from 1 to 12 carbon atoms and X is a halide selected from the group consisting of chloride, bromide and iodide,
wherein the molar ratio of said halogenated titanium compound to said Lewis base is in the range of about 0.7:1 to about 1.6:1, said first component containing from 1 to 35 weight percent of said titanium compound, from 1 to 50 weight percent of said Lewis base, from 1 to 65 weight percent of said dihalide of magnesium or manganese and from 1 to 25 weight percent of said aromatic compound.

8. The catalyst system of claim 7 wherein said Lewis base is an ester represented by the formula

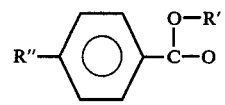

wherein R' is an alkyl group having from 1 to 4 carbon atoms and R" is a monovalent radical selected from the group consisting of —F, —Cl, —Br, —I, —OH, —OR', —OOCR', —SH, —NH$_2$, —NHR', —NR'$_2$, —NHCOR', —NO$_2$, —CN, —CHO, —COR', —COOR', —CONH$_2$, —CONR'$_2$, —CONHR', —SO$_2$R', —CH$_3$, and —H.

9. The catalyst system of claim 8 wherein the amount of said trialkylaluminum compound and said optional dialkylaluminum halide compound is such as to provide an atomic ratio of Al:Ti in the approximate range of 5:1 to 2000:1.

* * * * *